United States Patent [19]

Hirata

[11] 4,301,392
[45] Nov. 17, 1981

[54] ELECTRONIC FLASH SYSTEM CAPABLE OF AUTOMATIC FLASH DURATION CONTROL

[75] Inventor: Shinji Hirata, Toyonaka, Japan

[73] Assignee: West Electric Co., Ltd., Osaka, Japan

[21] Appl. No.: 136,882

[22] Filed: Apr. 3, 1980

[30] Foreign Application Priority Data

Apr. 9, 1979 [JP] Japan .................................. 54-43241

[51] Int. Cl.³ ............................................ H05B 41/32
[52] U.S. Cl. .............................. 315/241 P; 315/133; 315/136; 315/151
[58] Field of Search ............................... 315/134–136, 315/151, 241 P, 133, 120; 354/33, 127, 128, 145; 340/393

[56] References Cited

U.S. PATENT DOCUMENTS 3,898,514 8/1975 Takahashi .......................... 315/136
4,100,459 7/1978 Nakamura et al. ............. 315/135 X

*Primary Examiner*—Eugene R. LaRoche
*Attorney, Agent, or Firm*—Burgess, Ryan and Wayne

[57] ABSTRACT

In an automatic flash duration controllable electronic flash system of the type in which in response to the quantity of light reflected back from a subject illuminated by the flash light emitted from a flash lamp and intercepted by a photosensor circuit or the like, the flash lamp is turned off, a signaling device capable of signaling not only whether or not the voltage stored across a main discharge capacitor has reached to a predetermined level for flash exposure but also whether or not an automatic flash duration control after triggering the flash lamp has been completed.

6 Claims, 3 Drawing Figures

(a) MAIN DISCHARGE CAPACITOR 4
(b) NEON BULB 16
(c) OSCILLATOR 20
(d) TRANSISTOR 22
(e) SOUND SIGNAL GENELATOR 31

ELECTRONIC FLASH SYSTEM CAPABLE OF AUTOMATIC FLASH DURATION CONTROL

BACKGROUND OF THE INVENTION

The present invention relates to an electronic flash system capable of automatic flash duration control and more particularly an electronic flash system of the type described and which further includes a signaling device which can signal not only whether or not the voltage stored across a main discharge capacitor has reached a predetermined value for flash exposure but also whether or not an automatic flash duration control after triggering a flash lamp has been completed.

Electronic flash systems which are now available commercially are not provided with a means for signaling that the voltage stored across a main discharge capacitor has reached a predetermined level for permitting a flash exposure. Incorporation of such signaling means into the electronic flash systems is obviously advantageous.

Meanwhile the operations of the electronic flash systems capable of automatic flash duration control have been much improved since the devices for signaling whether or not an automatic flash duration control has been completed have been devised and incorporated in the flash systems.

These signaling devices include sound signal generating means, light signal generating means or both and are fabricated independently of the electronic flash systems or build in the systems. In the latter case, there arises the problem that the electronic flash system becomes large in size, complex in construction and high in production cost.

SUMMARY OF THE INVENTION

The primary object of the present invention is to provide an electronic flash system capable of automatic flash duration control and provided with a common signaling means for signaling not only whether or not the voltage stored across a main discharge capacitor has reached a predetermined level for permitting a flash exposure but also whether or not the automatic flash duration control has been accomplished after a flash lamp was triggered.

Another object of the present invention is to provide an electronic flash system capable of automatic flash duration control and provided with a common signaling device capable of signaling acoustically, visually or both not only whether or not the voltage across a main discharge capacitor has reached a predetermined level for permitting a flash exposure but also whether or not an automatic flash duration control after triggering a flash lamp has been accomplished, said signaling device comprising an oscillator which is controlled in response to the output from a stored-voltage sensing circuit for sensing the voltage stored across the main discharge capacitor, an operation mode sensing circuit which is controlled in response to the output from a flash duration control circuit, and a comon signaling means capable of generating not only a first signal, acoustic, visual or both, indicating that the voltage across the main discharge capacitor has reached a predetermined level so that a flash exposure may be permitted at any time, but also a second signal, acoustic, visual or both, indicating that an automatic flash duration control has been completed, the first signal being generated in response to the output from the oscillator while the second signal being generated in response to the output from the operation mode sensing circuit.

More specifically, the present invention provides, to the above and other ends, an electronic flash system capable of automatic flash duration control and of the type comprising a main capacitor, a flash lamp for converting the energy stored in said main discharge capacitor into light, a photosensor circuit for intercepting the light reflected back from a subject illuminated by the light emitted from said flash lamp, and a flash duration control circuit responsive to the output signal from said photosensor circuit for controlling the duration of flash light emitted from said flash lamp, characterized by further comprising a stored voltage sensing circuit for sensing the voltage across said main discharge capacitor; a first switching means which is controlled in response to the output from said stored-voltage sensing circuit; an oscillator means which is controlled in response to the output from said first switching means; a signaling means which is controlled in respone to the output from said oscillator means; an operation mode sensing circuit for sensing the operation mode of said flash duration control circuit; and a second switching means responsive to the output from said operation mode sensing circuit for controlling the mode of operation of said signaling means [in such a way that said signaling means is switched from a first mode for generating a first signal indicating that the voltage stored across said main discharge capacitor has reached a predetermined level to a second mode for generating a second signal indicating that the automatic flash duration control after triggering of the flash lamp has been completed].

The above and other objects, features and advantages of the present invention will become more apparent from the following description of a preferred embodiment thereof taken in conjunction with the accompanying drawings.

DESCRIPTION OF THE PREFERRED EMBODIMENT

Figure 1:
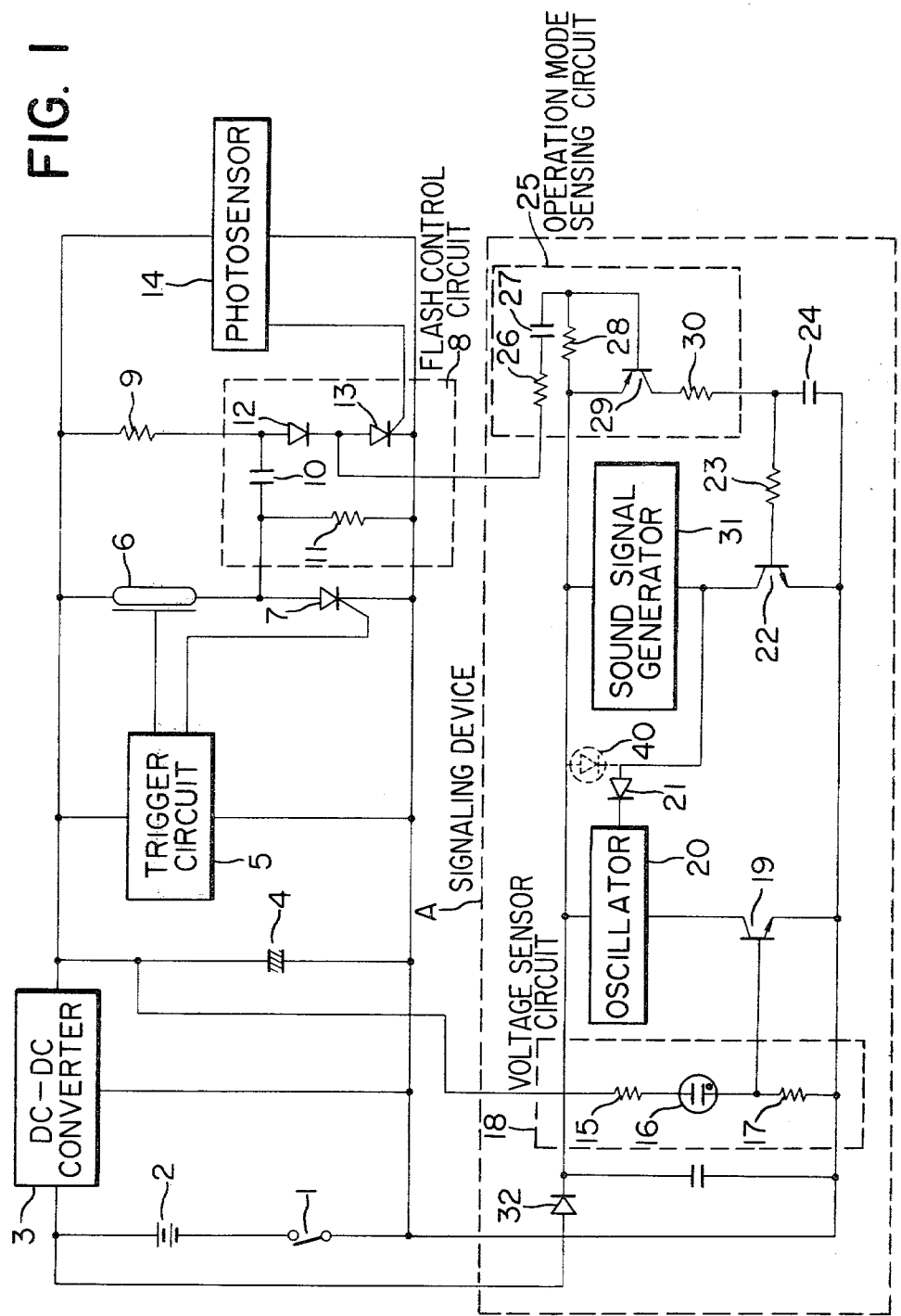
FIG. 1 is a circuit diagram of an electronic flash system in accordance with the present invention.

Referring to FIG. 1, reference numeral 1 denotes a power switch; 2, a power supply or source; 3, a conventional DC—DC converter; 4, a main discharge capacitor; 5, a trigger circuit for triggering both a flash lamp 6 and a main switching element 7; and 8, a flash control circuit consisting of a commutation capacitor 10 which is charged through resistors 9 and 11, an auxiliary switching element 13 which is controlled by a photosensor 14 and a diode 12.

A signaling device A the mode of operation of which has been previously described comprises a stored-voltage sensor circuit 18 for sensing the voltage charged across the main discharge capacitor 4 which consists of resistors 15 and 17 and a neon bulb 17; a switching element or transistor 19 which is controlled by the sensor circuit 18; an oscillator 20; a diode 21; a switching element or transistor 22; a resistor 23; an operation mode sensing circuit 25 which is controlled by the flash control circuit 8 and consists of a resistor 26, a capacitor 27, a resistor 28, a resistor 30 and a switching element or transistor 29; and a sound generator 31.

Next referring further to FIG. 2, the mode of operation of the electronic flash system with the above construction will be described. When the power switch 1 is closed at To, the power is supplied from the power source 2 through the DC—DC converter 3 to the main discharge capacitor 4 and the commutation capacitor 10 so that the capacitors 4 and 10 are charged in the manner well known in the art.

Figure 2:
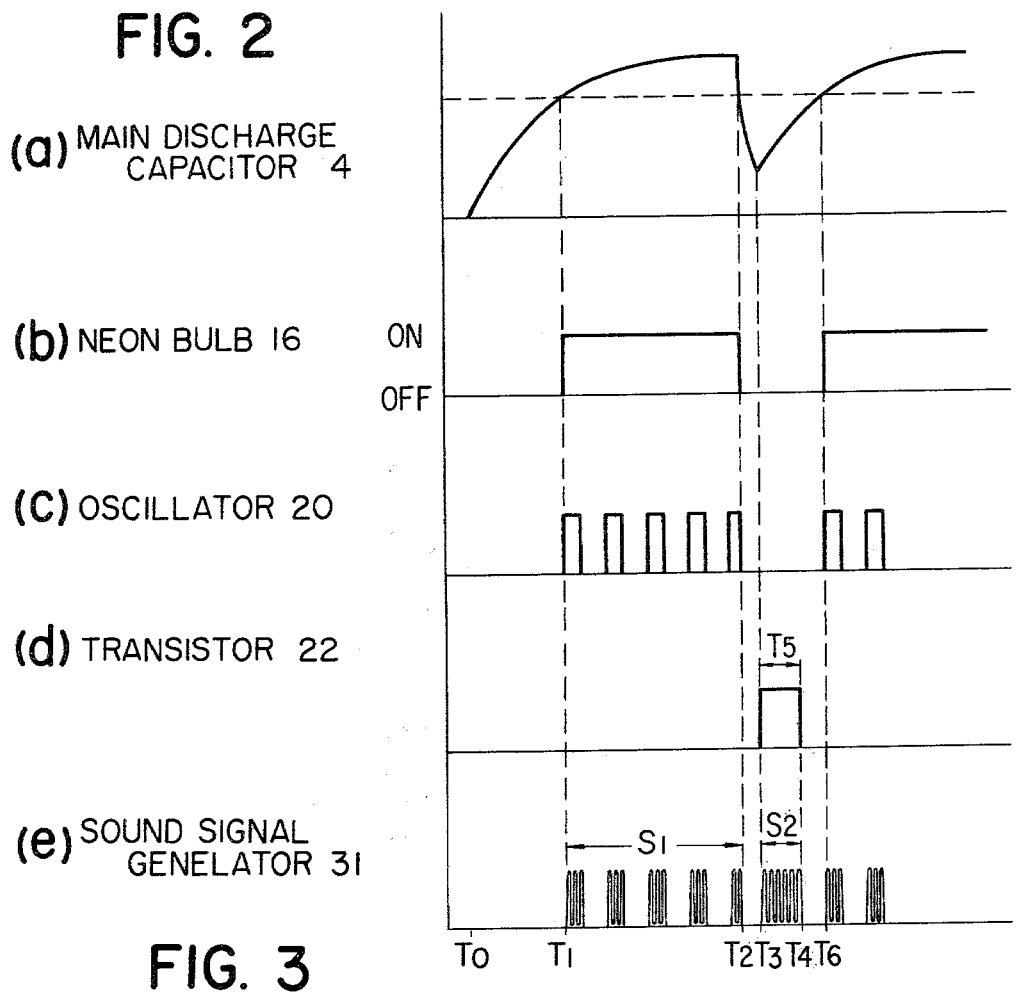
FIG. 2 is a view used for the explanation of the mode of operation thereof.

When the voltage across the main discharge capacitor 4 reaches a predetermined value V (See FIG. 2a) at which the flash lamp 6 can emit a predetermined quantity of light, the stored voltage sensor circuit 18 is enabled; that is, the neon bulb 16 is turned on as indicated at (b) in FIG. 2. As a result, the current flows through the series circuit consisting of the resistor 15, the neon bulb 16 and the resistor 17.

Figure 3:
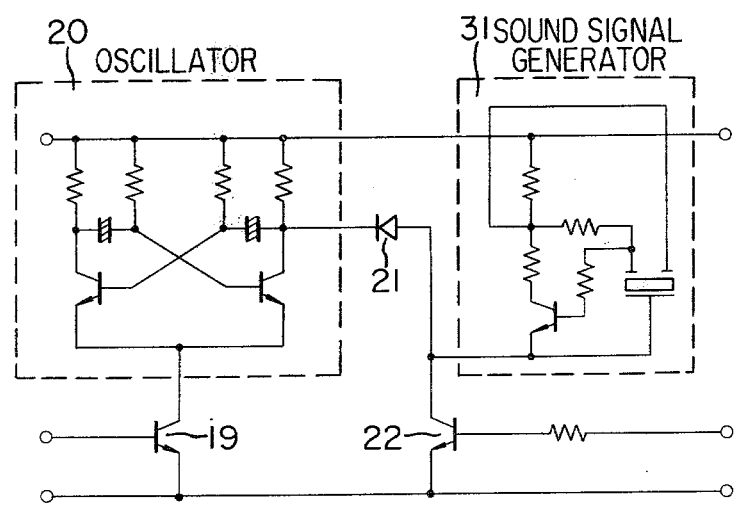
FIG. 3 shows a detailed circuit configuration of an oscillator and a signaling circuit in the electronic flash system shown in FIG. 1.

Then, because of the resultant voltage drop cross the resistor 17, the transistor 19 is enabled so that the oscillator 20 is also enabled as indicated at (c) in FIG. 2. In response to the output signal of a predetermined frequency from the oscillator 20, the sound generator 31 generates a series of intermittent first sound signals $S_1$ as indicated at (e) in FIG. 2, the occuring frequency of the intermittent sound signals $S_1$ being predetermined. As a result, an operator may confirm that the main discharge capacitor 4 has been charged to a predetermined voltage level while looking through a viewfinder of the camera. In FIG. 3 is shown the detailed circuit configuration of the oscillator 20 and the sound generator 31.

Simultaneous with the activation of the oscillator 20 and the sound generator 31, the capacitor 27 is charged through the resistor 9, the diode 12 and the resistor 26 and through the resistor 28, the oscillator 20 and the transistor 19. Now the voltage across the main discharge capacitor 4 is rising beyond a predetermined level V and the first sound signals $S_1$ are intermittently generated. When, at $T_2$, the trigger circuit 5 triggers the flash lamp 6 and the main switching element 7, the flash lamp 6 is lighted; that is, the energy stored in the main discharge capacitor 4 is converted into flash light. Since the voltage across the main discharge capacitor 4 drops, the transistor 19 is turned off so that the sound generator 31 is disabled.

The photosensor 14 intercepts the light rays reflected back from an object. When the photosensor 14 has received a predetermined quantity of light at $T_3$, the flash duration control circuit 8 is enabled; that is, the auxiliary switching element 13 is enabled. As a result, the commutation capacitor 10 is discharged through the diode 12 and the auxiliary switching element 13 so that the main switching element 7 is reverse-biased. As a consequence, the flash lamp 6 is turned off; that is, the so-called "automatic flash duration control" is accomplished.

Simultaneous with the discharge of the commutation capacitor 10 in response to the conduction of the auxiliary switching element 13, the capacitor 27 of the operation mode sensing circuit 25 is also discharged through the resistor 26, the auxiliary switching element 13, the power switch 1, the power supply 2, the diode 32 and the resistor 28. As a result, the transistor 29 is enabled so that the capacitor 24 is charged through the transistor 29 and the resistor 30 and, consequently the transistor 22 is turned on. As a result, the sound signal generator 31 which has been so far controlled by the oscillator 20 through the diode 21 is now controlled through the transistor 22. That is, as long as the transistor 22 is in the conduction state, the sound signal generator is kept operating or generating a continuous second sound signal $S_2$ as indicates at (e) in FIG. 2. From this continuous second sound signal $S_2$ which can be distinctly distinguished from the intermittent sound signals $S_1$, the operator then may confirm acoustically that the flash duration control has been completed. Therefore with the electronic flash system of the present invention, the operator may acoustically confirm in a very simple manner that the voltage across the main discharge capacitor 4 has reached a predetermined level and that the automatic flash duration control has been accomplished. As a result, the operator may concentrate his or her attention on focusing and framing.

The time period of conduction of the transistor 22 is controlled by the voltage charged across the capacitor 24 as will be described in detail below. As described previously, the capacitor 24 is charged through the transistor 29 which is enabled in response to the discharge of the capacitor 27 caused by the conduction of the auxiliary switching element 13. It follows therefore that the charging time is equal to the time period of conduction of transistor 29.

Since the transistor 29 is switched into the conduction state in response to the discharge of the capacitor 27 through the auxiliary switching element 13, the time period of conduction of the transistor 29 is therefore equal to that of the auxiliary switching element 13. Since the capacitance of the capacitor 27 is smaller than that of the commutation capacitor 10, the "ON" duration of the auxiliary switching element is equal to the discharging time of the commutation capacitor 10 required for reverse-biasing the main switching element 7; that is, to the operating time of the flash duration control circuit 8 which is of the conventional type.

It follows therefore that the transistor 29 is maintained in the conduction state during the operating time of the flash duration control circuit 8; that is, from the time when it is enabled until the time when it is disabled. During the same time period, the capacitor 24 is charged and when the voltage across the capacitor 24 reaches a predetermined level, the transistor 22 is enabled as described previously.

Upon completion of the operation of the flash duration control circuit 8, the transistor 29 is turned off and, consequently, the capacitor 24 is not charged any longer and is discharged through the resistor 23 and the base and emitter of the transistor 22. As a result, even after the transistor 29 has been disabled, the transistor 22 is kept in the conduction state for a time period which is dependent upon the values of the capacitor 24 and the resistor 23.

As described above and as indicated at (d) in FIG. 2, the "ON" duration of the transistor 22 is $T_5$; i.e. from the time $T_3$ when the transistor 29 is turned off after it has been turned on so as to increase the voltage across the capacitor 24 to a level at which the transistor 22 is enabled, to the time $T_4$ when the transistor 22 is turned off due to the voltage drop across the capacitor 24. During this duration $T_5$ the sound signal generator 31 keeps generating the second sound signal $S_2$ which is continuous as indicated at (e) in FIG. 2.

When the voltage across the main discharge capacitor 4 reaches a predetermined level again at $T_6$, the transistor 19 is turned on again so that the sound signal generator 31 generates the intermittent sound signals $S_1$ in the manner described elsewhere. After the flash lamp 6 has been triggered and lighted for predetermined time duration, the sound generator 31 then generates the continuous second sound signal $S_2$.

The duration of the second sound signal $S_2$ is equal to the "ON" duration $T_5$ of the transistor 22 which in turn may be suitably selected by controlling the charging and discharging time of the capacitor 24.

The oscillator 20 and the sound signal generator 31 is interconnected through the diode 21 so that when the transistor 22 is turned on, the sound generator 31 will not respond to the output signal from the oscillator 21. Therefore when the transistor 22 is turned on when the sound signal generator 31 is generating the intermittent sound signals $S_1$ under the control of the oscillator 20, the sound signal generator 31 is forced to switch to produce the continuous sound signal $S_2$.

So far the present invention has been described in conjunction with the sound signals $S_1$ and $S_2$, but it is to be understood that instead of the audio signals, the visual or light signals by light bulbs, light-emitting diodes or the like and the combination of the audio and visual signals may be used. For instance, instead of the sound signal generator 31, a light-emitting diode 40 may be inserted as indicated by the broken lines in FIG. 1. From $T_1$ to $T_2$ the light-emitting diode 40 flashes indicating that the voltage across the main discharge capacitor 4 has reached a predetermined level and from $T_3$ to $T_4$ it emits the light continuously, thereby indicating the completion of the automatic flash duration control. Alternatively, both the sound signal generator 31 and the light-emitting diode 40 may be used in parallel. The light-emitting diode or the like may be disposed within the viewfinder of a camera so that an operator may see the light signals while focusing and framing.

What is claimed is:

1. In an electronic flash system capable of automatically controlling the flash duration and comprising:
    a main discharge capacitor;
    a flash lamp for converting the energy stored in said main discharge capacitor into light;
    a photosensor circuit for providing an output signal in response to the light reflected back from a subject illuminated by the light emitted from said flash lamp; and
    a flash duration control circuit responsive to the output signal from said photosensor circuit for controlling the flash duration of said flash lamp, the improvement comprising:
    (a) a stored-voltage sensing circuit for sensing the voltage stored across said main discharge capacitor;
    (b) a first switching means which is controlled in response to the output from said storage-voltage sensing circuit;
    (c) an oscillator means which is controlled in response to the output from said first switching means;
    (d) a sound signal generating means coupled to said oscillator means for generating (i) a first sound signal of a first frequency in response to the output from said first switching means and (ii) a second sound signal, the frequency of which is different from said first frequency, in response to the output from a second switching means;
    (e) an operation mode sensing circuit for sensing the operation mode of said flash duration control circuit; and
    (f) a second switching means responsive to the output from said operation mode sensing circuit for controlling the mode of operation of said sound signal generating means.

2. An electronic flash system capable of automatic flash duration control as set forth in claim 1, wherein
    said second switching means is controlled through a time constant circuit; and
    the charging and discharging time of a capacitor in said time constant circuit including a capacitor is controlled in response to the output from said operation mode sensing circuit.

3. An electronic flash system capable of automatic flash duration control as set forth in claim 2, wherein
    said second switching means comprises (i) a switching element which is controlled in response to the output from said time-constant circuit, and (ii) a means for suppressing the coupling between said oscillator means and said sound signal generating means during the time when said switching element is kept in the conductive state.

4. An electronic flash system capable of automatic flash duration control as set forth in claim 1 wherein
    said first switching means comprises a transistor which is turned on by the output from said stored-voltage sensing circuit when the voltage stored across said main discharge capacitor reaches a predetermined level, thereby actuating said oscillator means.

5. An electronic flash system capable of automatic flash duration control as set forth in claim 1, wherein
    said operation mode sensing circuit comprises (i) a circuit for generating an electrical signal during the operation of said flash duration control circuit, and (ii) a switching element which is turned on in response to said electrical signal.

6. An electronic flash system capable of automatic flash duration control as set forth in claim 1, further comprising
    a light emitting means coupled to said second switching means for operation simultaneously with said sound signal generating means.

* * * * *

UNITED STATES PATENT AND TRADEMARK OFFICE
CERTIFICATE OF CORRECTION

PATENT NO. : 4,301,392
DATED : November 17, 1981
INVENTOR(S) : Shinji Hirata

It is certified that error appears in the above—identified patent and that said Letters Patent is hereby corrected as shown below:

Fig. 2(e) of the Drawings: "Genelator" should be --Generator--.

Column 1, line 31: "build" should be --built--.

Column 2, line 20: "respone" should be --response--.

Column 6, line 21: After "circuit", insert --including a capacitor--.
        line 22: "a" should be --the--.
        line 23: cancel "including a capacitor".

Signed and Sealed this

Eighteenth Day of January 1983

[SEAL]

Attest:

GERALD J. MOSSINGHOFF

Attesting Officer     Commissioner of Patents and Trademarks